No. 647,153. Patented Apr. 10, 1900.
G. B. PETSCHE.
VALVE AND VALVE ACTUATING MECHANISM FOR PUMPS, &c.
(Application filed July 31, 1897.)
(No Model.) 2 Sheets—Sheet 1.

Witnesses
Inventor.
Gustav B. Petsche
his Attorney.

No. 647,153. Patented Apr. 10, 1900.
G. B. PETSCHE.
VALVE AND VALVE ACTUATING MECHANISM FOR PUMPS, &c.
(Application filed July 31, 1897.)
(No Model.) 2 Sheets—Sheet 2.
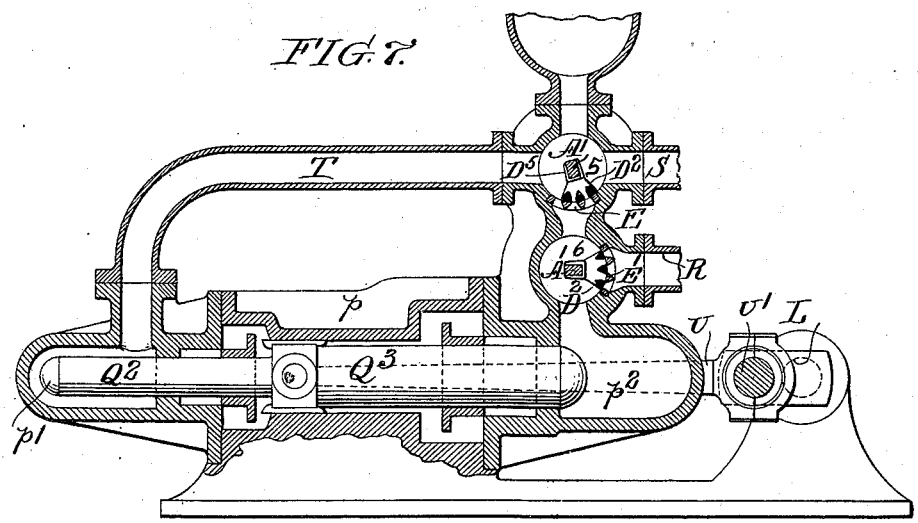
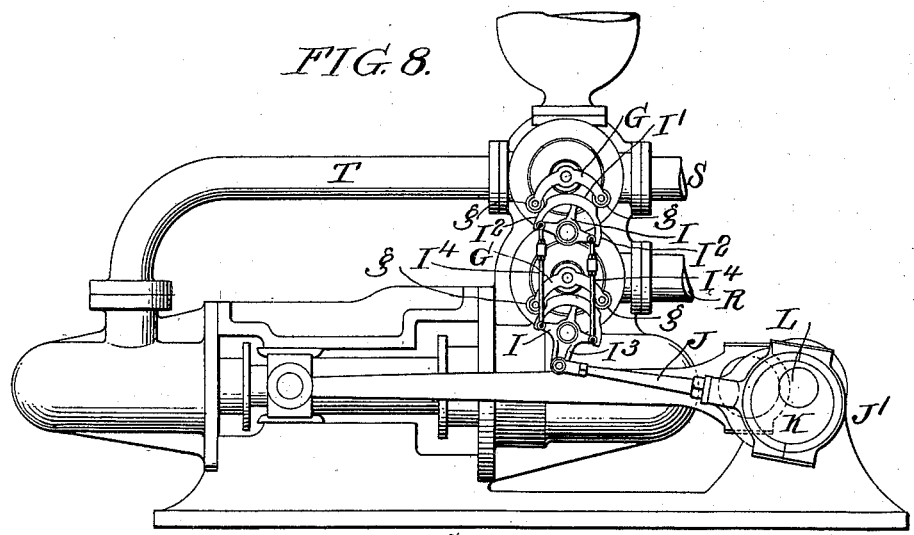
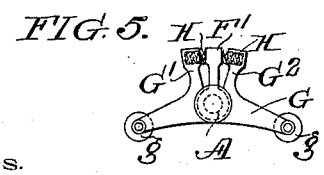
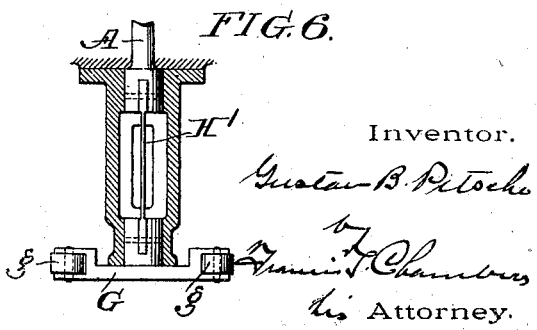
Witnesses. Inventor.

UNITED STATES PATENT OFFICE.

GUSTAV BERNHARD PETSCHE, OF PHILADELPHIA, PENNSYLVANIA, ASSIGNOR TO THE SOUTHWARK FOUNDRY AND MACHINE COMPANY, OF SAME PLACE.

VALVE AND VALVE-ACTUATING MECHANISM FOR PUMPS, &c.

SPECIFICATION forming part of Letters Patent No. 647,153, dated April 10, 1900.

Application filed July 31, 1897. Serial No. 646,631. (No model.)

*To all whom it may concern:*

Be it known that I, GUSTAV BERNHARD PETSCHE, a subject of the Emperor of Germany, residing in the city and county of Philadelphia, in the State of Pennsylvania, have invented a certain new and useful Improvement in Valves and Valve-Actuating Mechanism for Pumps and other Machines, of which the following is a true and exact description, reference being had to the accompanying drawings, which form a part hereof.

My invention relates to the construction of valves and the mechanism for operating valves, and as designed is especially intended for use in connection with pumps for water or other liquids, though my mechanism is also applicable to other machines in which slide-valves are used, notably so with regard to compressing or blowing engines.

One object of my invention is, in the first place, to provide a slide-valve with a certain limited freedom of motion to and away from its seat and also with an additional freedom of motion against elastic pressure, by overcoming which it can move still farther in a direction away from its seat.

A further object is to provide a sliding rotary valve having a slight freedom of movement to and from its seat with actuating mechanism by which the power to open and close the valve is applied with great quickness and positiveness with regard to amount, but with a certain degree of elasticity as well.

Other objects and details of my invention will be best understood as described in connection with the drawings in which they are illustrated, and in which—

Figure 1:
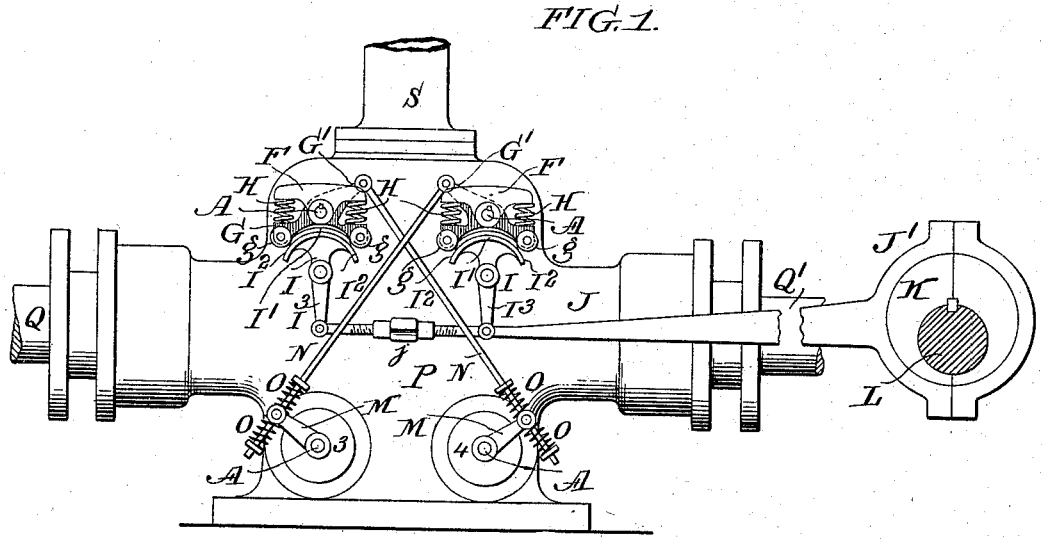
Figure 2:
Figure 3:
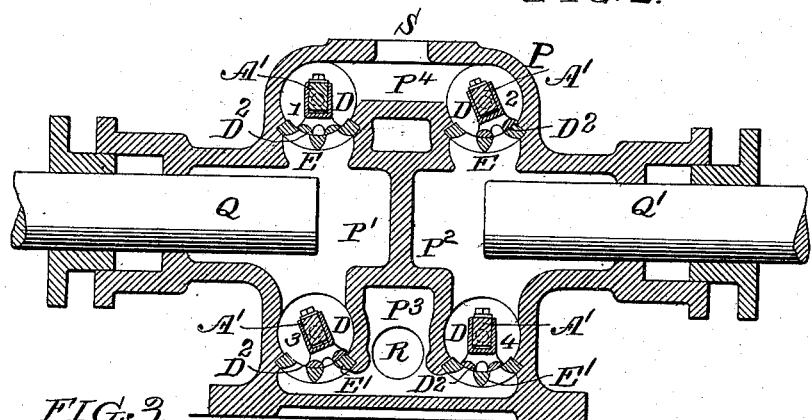
Figure 3:
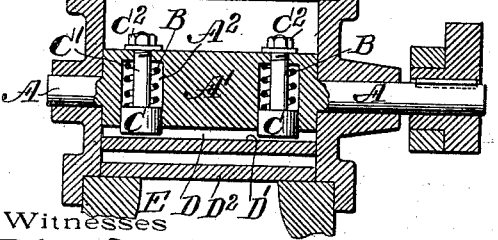
Figure 4:
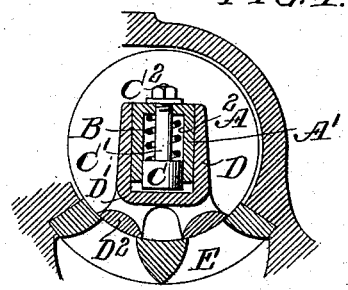

Figure 1 is a side elevation of a double-acting pump provided with my improved valves and valve-actuating mechanism. Fig. 2 is a longitudinal section through the said pump. Fig. 3 is a longitudinal section through one of the rotary valves; Fig. 4, a transverse section through one of the valves; Figs. 5 and 6, views illustrating modifications in the valve-actuating mechanism. Fig. 7 is a longitudinal vertical section through another form of pump also provided with my improvements, and Fig. 8 is a fragmentary side elevation of a portion of the pump shown in Fig. 7.

A (best shown in Fig. 3) indicates the valve-stem, upon the inner portion of which is formed or secured a guide-block A', which may conveniently be, as shown, of rectangular form, and in which I preferably form cavities $A^2$ $A^2$, in which I place springs B and stop-plungers C C, said plungers being attached to bolts C', upon the upper ends of which are adjusting-screws $C^2$. It will be obvious that by turning the screw $C^2$ the plunger C can be drawn up against the springs or relaxed, so that the springs can force them farther outward.

D is a guide conveniently made in the form of a yoke, as shown, fitting on the block A' and sliding thereon, the bottom portion D' of the yoke lying beneath the stop-plungers C and carrying the valve proper, which is indicated at $D^2$, and which is preferably of the rotary form illustrated, moving on a segmental seat, as indicated at E or E'. In practice and for use in connection with pumps I prefer to make the distances between the lower side of the block A' and the upper side of the valve, or rather the bottom of the yoke D', somewhat over a quarter of an inch, and I adjust the elastic plunger C so that the valve may have a slight movement to and from its seat E before coming into contact with the plungers. A distance of a sixty-fourth of an inch will be found sufficient, and I may mention that the distance should be as short as possible in order to avoid noise due to the valve hammering against the plungers and against its seat.

The valve shown in Figs. 1, 2, 3, 4, and 7 is the same for both the suction and delivery valves. Thus in Fig. 2 delivery-valves are indicated at 1 and 2 and suction-valves at 3 and 4, while in Fig. 7 a delivery-valve is indicated at 5 and a suction-valve at 6. The double-acting two-cylinder pump (indicated in Figs. 1 and 2) is indicated at P, the two chambers in which the plungers work being marked P' and $P^2$, while the two-valve pump (indicated in Figs. 7 and 8) is marked $p$ and the two plunger-chambers $p'$ and $p^2$.

R in both of the constructions shown indicates the supply-pipe, and S the delivery-pipe, $P^3$ in Fig. 2 indicating the supply-chamber into which both of the valves 3 and 4 open, while P⁴ indicates the delivery-chamber into which both of the valves 1 and 2 open, and it will be observed that the valves are situated so that the suction-valve faces the incoming water and the delivery-valve faces the outgoing water. In this way the suction-valve is forced down against its seat by the pressure of the plunger advancing into the chamber, in which it opens and is sucked up away from its seat by the vacuum formed by the outward stroke of the plunger, while the delivery-valve is held to its seat by the pressure of the water in the delivery-main and lifted from its seat by the pressure exerted by the plunger in the pump-chamber. I provide for the slight free outward motion of the valve, so that it will readily leave contact with its seat as soon as the pressures upon both sides of it are equalized, thus facilitating the sidewise motion of the valve by which the outer opening of the port is effected by eliminating or decreasing very greatly the element of friction resisting the opening of the valve. The further capacity of my valve to open against elastic pressure is useful in case for any reason the sidewise movement by which the valve is opened is not sufficiently prompt to give free passage to the water through the valve-ports. In such case the pressure of the water against the face of the valve will force it up away from its seat, giving free passage to the water until such time as the sidewise motion of the valve accomplishes the normal opening.

The sidewise motion may be given to the valve by any convenient mechanism; but I prefer to combine with it the cam mechanism shown and which in itself forms the subject-matter of another application for Letters Patent filed July 31, 1897, Serial No. 646,632, and also to actuate the valves by the application of elastic rather than positive and unyielding pressure applying the power to open the valves slightly before the time when they should normally open and relying upon the frictional resistance of the valve upon its seat to hold the valve closed until such time as the pressure tending to hold it closed is practically counterbalanced, whereupon the elimination of the element of frictional resistance will permit the elastic pressure to open the valve with great force and speed. This method of operating the valves of liquid-pumps also forms the subject-matter of another application for Letters Patent filed by me July 31, 1897, Serial No. 646,629, and is only referred to and claimed herein in combination with other features of construction.

Referring again to the drawings, F in Fig. 1 indicates a rock-lever attached to the valve-stem A, and G an equilateral rock-lever turning freely upon such valve-stem, which is the most convenient point upon which to pivot it, although it will be understood that it might be pivoted upon an independent support. The rock-lever G is provided with cam-contacting surfaces or rollers, as indicated at $g\,g$, and operates in connection with the cam I, which is a rock-cam having elevated and depressed segmental spaces, as indicated at I' and I², the faces being connected by symmetrical inclines and the length of the elevated faces being such with reference to the distance between the cam-rollers $g\,g$ that the said rollers will always remain in contact with the cam-face, the one resting on the elevated and the other on the depressed segmental faces and passing simultaneously over the inclines, so as to keep contact with the cam as it shifts the rock-lever from one position to another. In this way I secure the quick action of the cam and preserve at the same time the same positive rigidity of action as is usually obtained by the use of pivoted links. The rock-lever G could of course be secured to the valve-stem A, in which case the valve would necessarily move at the same time with the rock-lever; but to provide for the elastic pressure, which I have before mentioned, I use the rock-lever F and connect it with the idler rock-lever G by the springs H H, as shown in Fig. 1, in this way securing the prompt application of the power to open or close the valves, but securing also the quality of elasticity in its application, which is desirable for the reasons I have mentioned. In Fig. 5 I have illustrated in place of the rock-lever F a single-armed lever F', which is secured to the valve-stem A and coupled with the rock-lever G through two springs H H, acting against arms G' and G², extending angularly upward from the top of the rock-lever, and in Fig. 6 I have illustrated still another modification, in which the rock-lever G is directly coupled with the valve-stem A by a torsional spring H'.

The cams I I (shown in Fig. 1) are both actuated from the same eccentric K, coupled to the main shaft L of the pump by an eccentric-strap J' and rod J, $j$ indicating an adjusting-turnbuckle in the part of the rod which extends between the two arms L³ of the cams. The delivery-valves, which are thus directly connected with the actuating mechanism, I have shown as coupled by rods N N with the suction-valves, the delivery-valve on one side of the pump being coupled to the suction-valve on the other side of the pump, because these valves should open and close practically at the same time; but to impart to the suction-valve the same elastic pressure which it is desirable to give to the delivery-valve I make the connection between the rods N and the levers M, which turn the valve-stems through springs, as indicated at O O, thus enabling the suction-valve to remain closed for a short time after the delivery-valve has opened, in case the balancing of pressures upon the suction-valve shall occur at a later time than upon the delivery-valve.

In the top of the pump (shown in Figs. 7 and 8) the suction-valve 6 is opened and the delivery-valve 5 closed while the pistons Q² and $Q^3$ are moving toward the left, and any liquid in the chamber $p'$ is forced out through the pipe T into the delivery-pipe S. At the end of the stroke to the right the valve 6 must be closed and the valve 5 opened, and the plunger $Q^3$, then moving toward the right, forces the water in the chamber $p^2$ partly into the delivery-pipe S and partly through the pipe T into the pump-chamber $p'$, the plunger moving in which latter chamber is of one-half the volume of the plunger $Q^3$. The valve-actuating mechanism for this pump, as indicated in Fig. 8, is practically the same as that indicated in Figs. 1 and 2, except that I have here shown a positive instead of an elastic application of the cam-powers to the valve, have coupled the rod J to the suction-valve cam, and have coupled the suction-valve cam to the delivery-valve cam by the rods $I^4$ $I^4$.

Having now described my invention, what I claim as new, and desire to secure by Letters Patent, is—

1. In combination with a valve adapted to move by a sliding sidewise motion over the seat, a valve-actuating guide-block as A', means for engaging the valve with the guide as yoke D arranged to permit a motion of the valve to and away from its seat and elastic yielding stops as plungers C and springs B arranged as specified to permit a free movement of the valve away from its seat for a short distance and a further outward movement against a yielding resistance.

2. In combination with a valve adapted to move by a sliding sidewise motion over the seat, a valve-actuating guide-block as A', means for engaging the valve with the guide as yoke D arranged to permit a motion of the valve to and away from its seat, elastic yielding stops as plungers C and springs B arranged as specified to permit a free movement of the valve away from its seat for a short distance and a further outward movement against a yielding resistance and means for adjusting said stops to vary the free movement of the valve.

3. In combination with a rotary valve-spindle as A having a guide-block as A' formed or secured thereon, a valve adapted to move by a sliding sidewise movement over its seat means as yoke D for securing the valve to the block A' so as to be moved by it while having a limited freedom of movement to and from its seat, elastic stops as C B secured to block A' and interposed between it and the top of the valve and means for adjusting said stops to permit a limited movement of the valve away from its seat without resistance and a further movement against elastic pressure.

4. In combination with a rotary valve-spindle as A having a guide-block as A' formed or secured thereon and made with cavities $A^2$ opening toward the valve, a rotary valve $D^2$ having a yoke D engaged with block A as described and so as to permit of a movement of the valve to and from its seat, stop-pistons as C secured in the cavities $A^2$ by bolts $C^3$, springs B secured in cavities $A^2$ and acting against pistons C and nuts as $C^2$ for adjusting the plungers as specified.

5. In combination with a rotary valve as $D^2$ adapted to move sidewise over its seat, a valve-spindle A having a guide-block A', means as yoke D for operatively connecting the valve and block while permitting the valve to move to and from its seat, an equilateral rock-lever as G having cam faces or rollers $g$ $g$, a rock-cam I having elevated and depressed segmental faces I' $I^2$ connected by inclines and adapted to maintain contact with cam-rollers $g$ $g$ at all times and a spring or springs connecting the rock-lever with the valve-stem.

6. In combination with a rotary valve as $D^2$ adapted to move sidewise over its seat, a valve-spindle A having a guide-block A', means as yoke D for operatively connecting the valve and block while permitting the valve to move to and from its seat, an adjustable elastic stop or stops interposed between the block A and valve $D^2$ as described, an equilateral rock-lever as G having cam faces or rollers $g$ $g$, a rock-cam I having elevated and depressed segmental faces I' $I^2$ connected by inclines and adapted to maintain contact with cam-rollers $g$ $g$ at all times and a spring or springs connecting the rock-lever with the valve-stem.

7. In combination with a rotary valve as $D^2$ adapted to move sidewise over its seat, a valve-spindle A having a guide-block A', means as yoke D for operatively connecting the valve and block while permitting the valve to move to and from its seat, an adjustable elastic stop or stops interposed between the block A and valve $D^2$ as described, an equilateral rock-lever as G having cam faces or rollers $g$ $g$, a rock-cam I having elevated and depressed segmental faces I' $I^2$ connected by inclines and adapted to maintain contact with cam-rollers $g$ $g$ at all times and means operatively connecting the rock-lever with the valve-stem.

GUSTAV BERNHARD PETSCHE.

Witnesses:
   CHAS. F. MYERS,
   D. STEWART.